United States Patent [19]

Versteege

[11] 4,039,369

[45] Aug. 2, 1977

[54] METHOD AND DEVICE FOR THE UNIFORM AND EVEN SPRAYING OF SURFACES IN A NON-CONTINUOUS PRODUCTION SYSTEM

[76] Inventor: Arnoldus Josef Versteege, Boulevard Paulus Loot 77, Zandvoort, Netherlands

[21] Appl. No.: 696,375

[22] Filed: June 15, 1976

[30] Foreign Application Priority Data

June 26, 1975 Netherlands ........................ 7507646

[51] Int. Cl.[2] ........................ B32B 31/04; B65C 11/04

[52] U.S. Cl. .................................... 156/551; 156/552; 156/578

[58] Field of Search ............... 156/547, 549, 551, 552, 156/578

[56] References Cited

U.S. PATENT DOCUMENTS

| | | | |
|---|---|---|---|
| 2,772,717 | 12/1956 | Ware, Sr. | 156/551 |
| 3,037,900 | 6/1962 | Hings et al. | 152/547 |
| 3,398,039 | 8/1968 | Klemm et al. | 156/549 |
| 3,576,696 | 4/1971 | Normanton | 156/547 |
| 3,582,428 | 6/1971 | Steinberg | 156/547 |

*Primary Examiner*—Douglas J. Drummond

[57] ABSTRACT

The invention is related to a method and apparatus for evenly applying an adhesive or protective spray-coating on f.i. sheets of plastic material and/or cardboard in a non-continuous production system. In such system spray-coating by normally stationary spray-nozzles occurs during the forward stroke of the driving unit and three phases of motion can be discerned. In phase I the motion is non-uniform and accelerated, in phase II it is uniform and in phase III it is again non-uniform, but decelerated.

In order to achieve uniform spraying in all three phases, in a first embodiment the spray material is applied intermittently during the non-uniform phases. In another embodiment of the invention the spray-nozzles are moved in a direction opposite to that of the sheets to be sprayed.

11 Claims, 3 Drawing Figures

Figure 1:
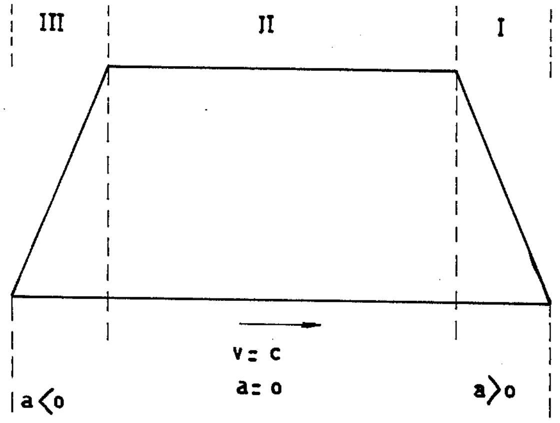

METHOD AND DEVICE FOR THE UNIFORM AND EVEN SPRAYING OF SURFACES IN A NON-CONTINUOUS PRODUCTION SYSTEM

This invention relates to a method for the application of a uniform and even spray layer in a non-continuous production system, onto surfaces by means of one or more spraying heads disposed near said surfaces.

In the gluing of sheets of card board or kraft paper and plastic foil webs for the manufacturing of file folders, book covers, trunk blanks and similar laminates in an intermittent production system the problem arises that during the starting and slowing-down phases of the intermittent conveyance of a conveyor belt the glue film cannot be applied uniformly onto the surface to be glued and is therefore invariably too thick. In prior art systems the glue heads are rigidly mounted and cooperate with nozzles having openings of various size. However, even when using a nozzle with the smallest openings, it often happens that still too much glue is being delivered. A further reduction in the glue delivery orifices by special means would readily result in clogging of said small-sized openings.

A typical speed of the conveyor belt for sheets of board and plastic foil webs is for instance a constant 30cm/sec. during the central phase of its stroke or cycle, but during the phase preceding said central phase the motion is accelerated because the belt has just started and has not yet attained its rated value (nominal speed). After the central phase the motion is slowing down in order to bring the belt to a rest. During the accelerated motion in the beginning and the slowing down motion at the end of the stroke of the conveyor the glue film will be thicker than during the uniform motion in the central phase. The overall stroke of the conveyor is adjustable for instance up to 70 cm. If an overall stroke of 60 cm is selected and the speed is 25 cm/sec., the central phase lasts 2.2 seconds while the length of the beginning and end phases is each 2.5 cm each lasting 0.2 seconds. On account of this non-uniform motion the glue film correspondingly exhibits a non-uniform thickness.

The main object of the present invention is therefore to eliminate or to reduce substantially the effect of these non-uniform regions of the stroke on the thickness of the film.

One solution to the above problem would be that during each intermittent advancement of the surface to be sprayed the spray layer is applied at least in the phase of uniform motion of the conveyor. For example it would be feasible to start spraying later and to stop spraying earlier. This possibility could be realized for example:

- by closing the glue feed during phase I (starting phase) and phase III (slowing-down phase); and
- by moving the glue head to the position where the motion of the conveyor has just become uniform.

Another solution would be to have the feed of glue to the glue head controlled for example by the clamping beams for the intermittent driving of the conveyor belt, which beams ride over a micro-switch or the like, forming part of a controlling circuit.

Both methods however are not very attractive because of their leading to glueless zones which attain double-sized dimensions since the end phase (III) of one cycle must be added to the start area (I) of the next cycle. This would result in large-sized scrap strips. Furthermore, the starting and slow-down times of the conveyor could be longer than the time periods calculated above, which latter can only be attained under very ideal conditions.

So when it is desired to use efficiently a greater length in the travelling direction of the belt these relatively wide glueless zones become unacceptable.

This difficulty can be overcome by a first embodiment of the present invention in that for eliminating wholly or greatly the starting and slowing down areas the glue head is moved in a direction opposite to the direction in which the materials to be glued together are being conveyed, so that in this case the delivery of the glue is reduced during the starting and the slowing-down phases, without the creation of undesirable glueless areas.

Thus the undesirable effects occurring during the starting and slowing-down phases of the belt are eliminated or at least greatly reduced since they are absorbed within the effective spraying time of the counter-moving heads. There is now moreover the additional advantage of varying the speed of the spraying head so that the thickness of the sprayed film can be influenced. Therefore, in accordance with a further feature of the present invention, for adjusting the thickness of the glue-film the relative speed between the material to be glued and the glue head is varied. Thanks to the opposite movement of the glue head the relative speed between the glue head and the conveyor belt can be varied such that any desired glue thickness is obtainable which would not be possible with a conventional set of nozzles. This is because the use of nozzles with openings having too small a surface area would readily result in clogging. Another advantage is that glue types can be used having a greater range of viscosity. The controlling range in the thickness of the glue layer to be applied has therefore increased considerably whereas on the other hand the thickness of this glue film is uniform over virtually the full stroke inclusive of the starting and the slowing-down phases of the stroke.

Another embodiment of the present invention leading substantially to similar results is one, in which the spraying head (or heads) is rigidly mounted so that during the starting and slowing-down phases of the cycle the quantity of spray material to be applied is delivered intermittently.

Under the circumstances described above in respect of the speed of the transport belt and the duration of the various phases, it appears that in each of the beginning and end phases a double dose of spray material is delivered per second as in the central phase. If the quantity delivered per second in the beginning or end phase is halved by delivering the same in for instance four pulses separated by four intervals, the thickness of the spray layer will show a fluctuation. This fluctuating line in the beginning and end phases presents a kind of saw tooth-form, the sharp edges thereof fading away due to the running out of the glue. So on the average the thickness of the spray layer in the two phases will be equal to that in the middle phase.

This type of metering can be realized by ejecting the quantity of glue to be applied in the two phases, in the form of four pulses from the spray head. During the uniform phase the delivery by the spray head can then be again continuous. The number of pulses or the frequency of repetition or interruption may, of course, be altered.

The invention is also related to a device for gluing foil webs and/or reinforcing material for use with the method according to the invention, comprising supply spools for at least two webs of plastic material, a conveyor belt, a driving mechanism for the intermittent conveyance of the conveyor belt, supply means for feeding reinforcing material between two webs of plastic material, and one or more glue heads for spraying glue on the surfaces to be glued, and further means are provided for moving the glue head(s) in a direction opposite to the direction of motion of the conveyor belt.

Figure 2:
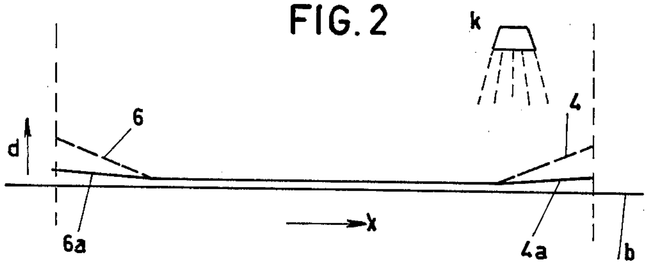
Figure 3:
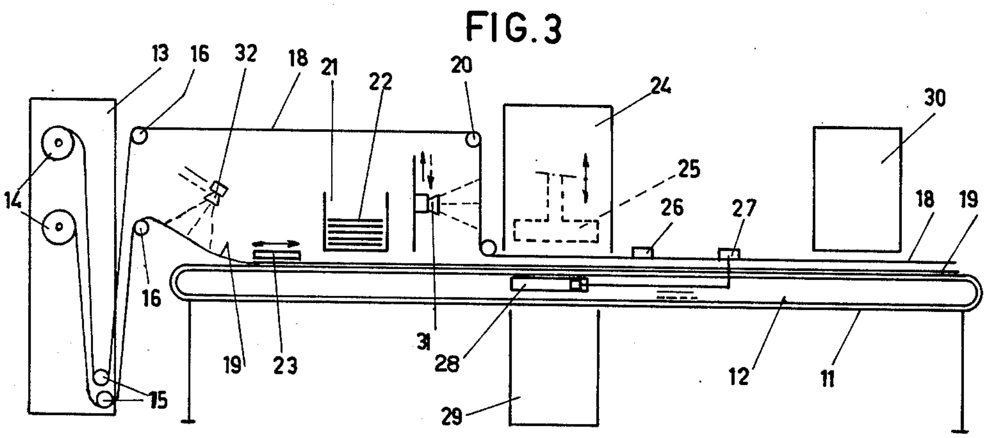

Other features and objects of the invention will be more evident from the following description whilst making reference to the accompanying drawings illustrating some preferred embodiments of the invention, in which FIG. 1 is a motion cycle of an intermittently advanced conveyor belt, being used in the method of the invention;

FIG. 2 is a schematic representation of the glue film, in an exaggerated fashion, applied onto a web of plastic foil or reinforcing sheet by means of a glue head; and FIG. 3 is an elevational view of a welding automatic machine for carrying out the method according to the invention.

In FIG. 1 is shown a motion cycle of a conveyor belt of an automatic welding machine for the manufacture of laminates composed of one or more webs of plastic foil and a sheet of reinforcing material, such as cardboard, which after gluing are secured to each other to form the cover of a book, file folder or the like.

The motion cycle consists of three phases I, II and III. Phase I is the starting phase, phase II the central phase in which the motion is uniform, and phase III the slowing-down or braking phase.

If a spray head *k* is rigidly mounted above a foil web *b,* it will apply a glue film, the overall thickness *d* of which is irregular, as shown on enlarged scale in FIG. 2 by means of line segments 4 and 6. However, when the spray head *k* is moved, during the gluing process, in the opposite direction of the belt (to the left in FIG. 2), the line segments 4 and 6 representing the thickness *d* of the layer will show a flatter, less steep course, as represented by the line segments 4*a* and 6*a.*

In FIG. 3 is schematically shown a complete automatic welding machine according to the invention for the manufacture of laminates of plastic foil and/or cardboard sheets.

The welding machine as shown has a frame 11 provided with an endless conveyor belt 12 of plastic material, such as polyester or any other suitable material, running about reversing rolls (not-shown) at both ends of the frame 11. At the beginning machine, to the left side of FIG. 3, a roller box 13 is disposed in which a number of rollers or supply spools 14 with material for the plastic foil webs are journalled, said number being two in the embodiment shown. The material of these spools 14 runs in separate sheets firstly downwards to and around rollers 15 and then upwards to rollers 16, the upper foil web 18 moving in the longitudinal direction of the conveyor belt 12 horizontally above and at a certain distance from the lower foil web 19 to a roller 20 and thence downward towards to conveyor belt 12, whereas the lower foil web 19 runs straight from its own roller 16 to virtually the beginning of the conveyor belt. Between these two webs 18 and 19 is located in this part of the machine an insert device 21 consisting of a holder or case for a stock of sheets of cardboard 22 to be used for the reinforcement of for instance book bindings, wrappers, jackets or covers. Prior to the heat-sealing and/or welding operation a cardboard sheet 22 can be inserted between both foil webs 18 and 19 during each cycle by means of an inserting plate 23, which sheet is encased between said webs during the sealing and/or welding operation. Next, seen in the travelling direction of the conveyor belt 12, a welding unit 24 is provided, containing a welding electrode 25 cooperating with a counterelectrode (not shown) located under the conveyor belt, and movable up-and-down and having an electrode shaped corresponding to the high frequency welds to be made.

Behind this welding unit 24 there is provided an intermittent driving unit composed of two clamping plates or beams 26 and 27 extending transversely of the conveyor belt.

The clamping beam 27 can be moved by means of a hydraulically driven piston 28 from the position shown in FIG. 3 to the clamping beam 26 and thence again to its original position shown in FIG. 3, taking along during this latter movement the conveyor belt 12 with the foil webs 18 and 19 resting thereon. Downstream from the clamping means 26, 27 a cutting device 30 is located for cutting the finished article, such as a book cover, off the two foil webs. A motor and gear box 29 complete the system.

For the gluing of the foil webs 18 and 19 and, if any, the reinforcing cardboard sheets, there are provided, ahead of the welding unit 24 movable glue spraying heads 31 and 32. The glue spraying head 31 atomizes the glue against the upper foil 18 and the glue spraying head 32 against the lower foil 19. The full line arrows related to the spray heads 31, 32 indicate the direction of displacement of the heads during the 3-phase motion of the belt 12 (i.e., countercurrently), while the dotted arrows denote the return of the spray heads to their original positions during the inter-cyclic operational intervals.

What has been said relative to the application of glue, applies to the same extent to the spraying of paint under analogous circumstances.

I claim:

1. A device for gluing plastic foil webs and equivalent material for forming laminates, which comprises supply spools for at least two webs, a conveyor belt for conveying said webs in spaced opposition to each other, a driving mechanism for intermittently moving said conveyor belt whereby during each said intermittent movement said conveyor belt is accelerated in a first phase, is moved with uniform motion in a second phase and is decelerated in a third phase, means for feeding reinforcing material between the two webs, at least one spray head for spraying glue on the surfaces of said webs to be glued, and means for applying substantially the same quantity of the glue in each of said three phases whereby the thickness of the glue coating is substantially uniform.

2. The device according to claim 1 wherein said means for applying the glue comprises means for moving said spray head in a direction opposite the direction of motion of said conveyor belt during said first and third phases.

3. The device according to claim 1 wherein said means for applying the glue comprises means for intermittently actuating said spray head during said first and third phases.

4. The device according to claim 1 wherein there is further provided means for varying the relative speed between said spray head and said conveyor belt during said first and third phases.

5. The device according to claim 1 wherein means are further provided for spraying the glue from said spray head in the form of pulses during said first and third phases and for continuously spraying the glue from said spray head during said second phase.

6. The device according to claim 1 wherein there are two of said spray heads with one of said spray heads being arranged to spray the glue against one surface of a first one of the webs and with the other of said spray heads being arranged to spray the glue against one surface of a second one of the webs that is in opposition to said sprayed surface of the first web.

7. The device according to claim 6 wherein means are included for orienting a portion of the first web in a substantially horizontal plane when the glue is sprayed thereon and wherein means are included for orienting a portion of the second web in a substantially vertical plane when the glue is sprayed thereon.

8. The device according to claim 6 wherein said means for applying the glue comprises means for moving said spray heads in a direction opposite the direction of motion of said conveyor belt during said first and third phases.

9. The device according to claim 6 wherein said means for applying the glue comprises means for intermittently actuating said spray heads during said first and third phases.

10. The device according to claim 6 wherein there is further provided means for varying the relative speed between said spray heads and said conveyor belt during said first and third phases.

11. The device according to claim 6 wherein means are further provided for spraying the glue from said spray heads in the form of pulses during said first and third phases and for continuously spraying the glue from said spray heads during said second phase.

* * * * *